UNITED STATES PATENT OFFICE.

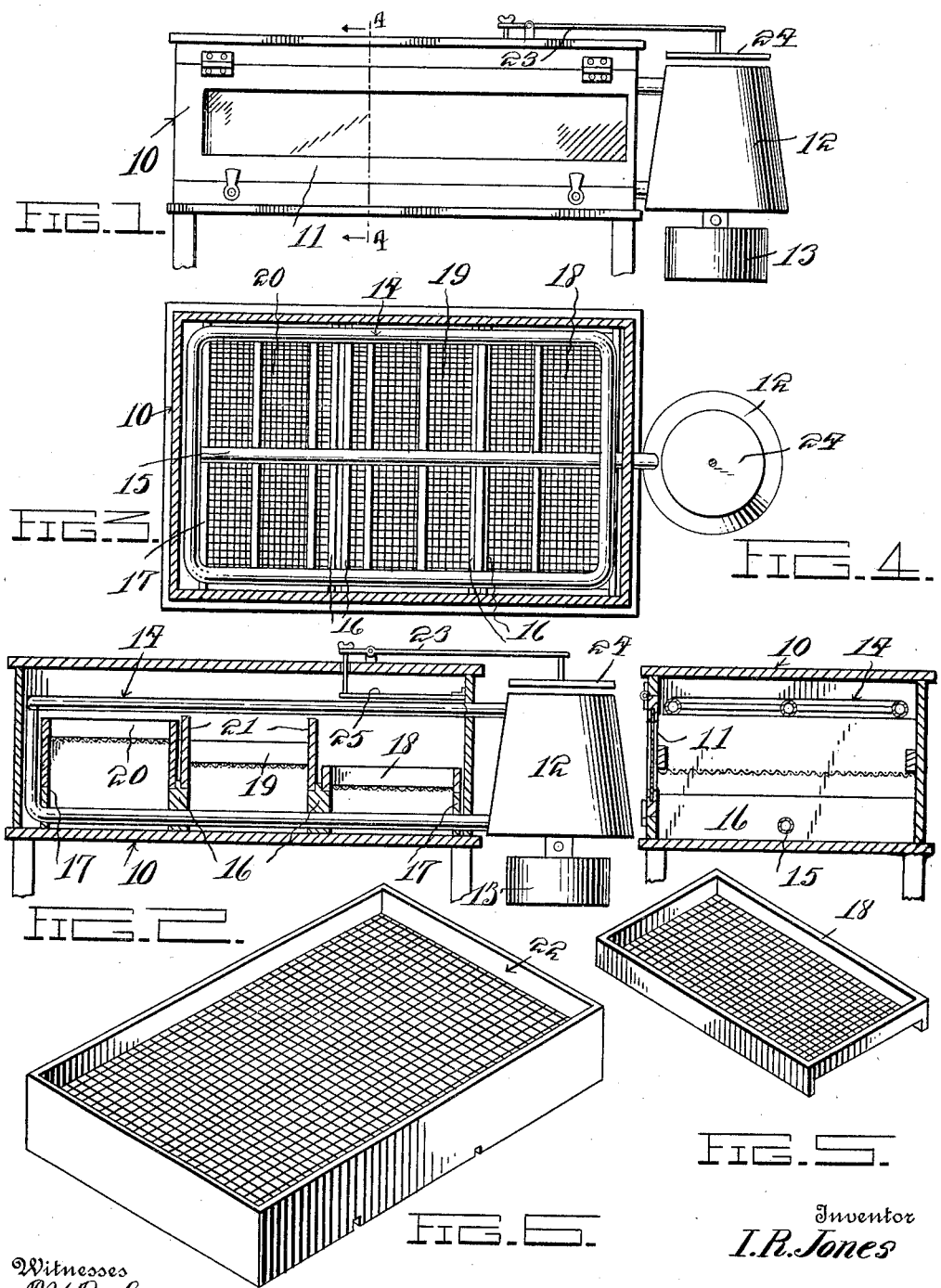

IRA R. JONES, OF UTICA, MISSISSIPPI.

INCUBATOR.

1,084,345. Specification of Letters Patent. Patented Jan. 13, 1914.

Application filed August 16, 1912. Serial No. 715,465.

*To all whom it may concern:*

Be it known that I, IRA R. JONES, a citizen of the United States, residing at Utica, in the county of Hinds, State of Mississippi, have invented certain new and useful Improvements in Incubators; and I do hereby declare the following to be a full, clear, and exact description of the invention, such as will enable others skilled in the art to which it appertains to make and use the same.

This invention has special reference to incubators and more particularly to the arrangement of the trays and construction thereof whereby their relative position with regard to the heater will be proportionately varied so that the eggs will be heated at a uniform temperature throughout the area of the incubator body.

Another and important object of the invention is to provide an incubator in which the heating apparatus, preferably hot water, is located at the top of the body and in which the trays are arranged in stepped relation.

The invention further consists in providing a door for inspecting the compartments and preventing any ventilation beneath the trays and the consequent chilling of the eggs in one tray while the fresh eggs in another tray are being inserted.

With the above and other objects in view, the invention consists of certain other combinations and arrangements of parts as will be hereinafter more fully described, claimed and illustrated in the accompanying drawings, in which:

Figure 1 is a front elevation of my improved incubator. Fig. 2 is a central longitudinal sectional view thereof. Fig. 3 is a top plan view with the top of the body removed. Fig. 4 is a cross sectional view taken on the line 4—4 of Fig. 1. Fig. 5 is a detail view of one of the small trays. Fig. 6 is a similar view of a large tray adapted to replace all of the small trays.

As illustrated, my improved incubator comprises a body 10 which as shown is of rectangular form but the shape of which may be varied as desired and the front portion of the incubator is provided with a glass closure or door 11 extending throughout the length of the body and adapted for gaining access to the interior of the incubator for placing and removing the trays and eggs carried thereby for inspecting the eggs as desired.

Arranged at one end of the body exteriorly thereof is a hot water heater 12, the water therein being heated from a lamp 13 so as to circulate the hot water around a rectangular pipe structure or radiator 14 disposed in close proximity and supported adjacent to the surrounding walls of the body near the top thereof while the return is made through a central pipe 15 so that the water enters the center part of the near end of the radiator and discharges from the central part of the far end thereof so that the outside portion of the incubator or chamber thereof is retained at the proper heat at a point first to be affected by outside changes of temperature and thus uniform heating is insured.

Arranged beneath the radiator or heater and transversely disposed relative to the body are a pair of intermediate guides 16 while at the ends of the body, end guides 17 are mounted to provide supports communicating with the open side of the body for slidably receiving a plurality of egg trays, preferably three in number. The tray nearest toward the lamp indicated by the numeral 18 has its bottom spaced a greater distance from the radiator than bottom of the central tray 19 and the tray 20 disposed at the far end of the body opposite to the lamp end, has its bottom disposed still closer toward the radiator, thus disposing the eggs positioned in the trays at different elevations and in step-like relation. The central tray also has its side portions 21 extended in close proximity to the radiator and it will thus be evident that there is no opportunity for ventilation beneath the tray so that cold air can not pass under the eggs to chill the same. The high sides on the center tray also prevent chilling of the eggs when renewing the eggs in one of the other trays and do not affect the temperature one degree on the old eggs when placing in new ones while the varying heights at which the trays are positioned are regulated to vary about one degree difference in temperature in the chambers at the far and near ends of the body.

In lieu of the plurality of trays above described, the door 11 is made to accommodate a single large tray 22 whereby all of the eggs may be hatched at the same time, it being obvious that the small trays are removed when employing the large tray. A regulator or controlling device is provided for maintaining the main chamber or interior of the body at the desired and uniform temperature and embodies a lever 23 pivoted on the body and controlling the opening and closing of a valve 24 positioned over the flue of the lamp and controlled in its movements by a thermostat 25 in the interior of the body so that when the chamber becomes cool the valve will close the flue to increase the heating qualities, whereas should the chamber become too warm, the valve will be opened, this operation being due to the expansion and contraction of the thermostat.

From the foregoing description in connection with the accompanying drawings, it will be apparent that I have provided a very efficient form of incubator and it is of course understood that the relative positions of the trays are regulated according to the size of the incubator.

In the practical use of the device, the eggs are first set in the tray next to the lamp and about a week later, additional eggs are set in the central tray and about a week later the far tray is set so that when the eggs in the tray next to the lamp or the near tray are hatched, the eggs in the tray opposite to the lamp are placed in the tray next to the lamp and the tray at the far end is then newly set. When the eggs in the middle tray hatch the eggs in the far end tray previously set are transferred to the middle tray and the end tray is again set so that all of the hatching takes place in the tray next to the lamp and the center tray while the new sets are always made in the end tray opposite the lamp so that the eggs are gradually and uniformly heated. Thus it will be seen that the hatching will be continuous, one tray of eggs hatching each week. It is also obvious that the end trays can be reversed in position so that the new settings will be placed next to the lamp and the hatchings will take place in the other trays.

I claim;

1. In an incubator, a body, a heating device therefor and a plurality of hatching trays arranged in the body and disposed in stepped relation, said trays communicating with each other at the top portion of the body.

2. In an incubator, a body, a heating device therefor and a plurality of trays arranged in the body and disposed in stepped relation, the centermost of said trays having its side walls extended to a point adjacent the top of the body to divide the adjacent trays partially therefrom.

3. The combination with an incubator body and heating means therefor; of a plurality of guides arranged at the bottom of the body and disposed on the same horizontal plane and trays mounted on the guides, said trays having their bottoms located at different elevations and in step-like relation.

4. The combination with an incubator body and heating means therefor; of a plurality of guides arranged at the bottom of the body and disposed on the same horizontal plane and trays mounted on the guides, said trays having their bottoms located at different elevations and the sides of the center tray extending upwardly to a point adjacent the heating means to divide the body into compartments communicating only at the top.

In testimony whereof, I affix my signature, in presence of two witnesses.

IRA R. JONES.

Witnesses:
D. FORTNER,
B. D. CURRIE.

---

Copies of this patent may be obtained for five cents each, by addressing the "Commissioner of Patents, Washington, D. C."